United States Patent
Park et al.

(10) Patent No.: US 11,005,299 B2
(45) Date of Patent: *May 11, 2021

(54) WIRELESS POWER TRANSMITTER AND RECEIVER FOR VEHICLE

(71) Applicant: LG ELECTRONICS INC., Seoul (KR)

(72) Inventors: Jinmoo Park, Seoul (KR); Jeongkyo Seo, Seoul (KR); Beomseok Chae, Seoul (KR); Jaesung Lee, Seoul (KR); Jihyun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

This patent is subject to a terminal disclaimer.

(21) Appl. No.: 16/450,263

(22) Filed: Jun. 24, 2019

(65) Prior Publication Data
US 2019/0312464 A1    Oct. 10, 2019

Related U.S. Application Data

(63) Continuation of application No. 15/541,180, filed as application No. PCT/KR2016/012682 on Nov. 4, 2016, now Pat. No. 10,505,398.

(Continued)

(51) Int. Cl.
*H01F 27/42*    (2006.01)
*H01F 37/00*    (2006.01)
(Continued)

(52) U.S. Cl.
CPC ............ *H02J 50/12* (2016.02); *B60L 53/122* (2019.02); *B60L 53/124* (2019.02);
(Continued)

(58) Field of Classification Search
CPC .. H02J 50/12; H02J 50/10; H02J 5/005; H02J 50/90; H02J 7/025; B60L 53/122;
(Continued)

(56) References Cited

U.S. PATENT DOCUMENTS

| 9,130,395 B2 | 9/2015 | Jung | |
|---|---|---|---|
| 2012/0098486 A1* | 4/2012 | Jung | H02J 5/005 320/108 |
| 2012/0242160 A1* | 9/2012 | Tseng | H04B 5/0037 307/104 |
| 2012/0242276 A1* | 9/2012 | Jung | H02J 7/04 320/103 |

(Continued)

FOREIGN PATENT DOCUMENTS

| JP | 2009-252970 A | 10/2009 |
|---|---|---|
| JP | 2012-511890 A | 5/2012 |

(Continued)

*Primary Examiner* — Daniel J Cavallari
*Assistant Examiner* — Rasem Mourad
(74) *Attorney, Agent, or Firm* — Birch, Stewart, Kolasch & Birch, LLP

(57) ABSTRACT

A wireless power transmitter that transfers power to a wireless power receiver includes a coil assembly comprising first and second bottom coils placed adjacent to each other in a line and each consisting of a single layer of 11 turns and a top coil stacked on the first and second bottom coils and consisting of a single layer of 12 turns; a series capacitance; a shielding extending to at least 2 mm beyond an outer boundary of the coil assembly, has a thickness of at least 1.5 mm and being composed of Mn—Zn; and a full-bridge inverter driving each of coils included in the coil assembly individually.

8 Claims, 16 Drawing Sheets

| Parameter | Symbol | Value |
|---|---|---|
| Top coil is placed alongside from a bottom coil with a displacement | $d_{bt}$ | 23±2mm |
| Bottom coils are placed alongside each other with a displacement | $d_{12}$ | 46±4mm |
| Self Inductance[@1V, 100kHz] of Primary Coil | $L_P$ | 11.3±0.7μH |
| Distance from the top surface of primary coil to interface surface of base-station | $d_z$ | 5.5±1.5mm |

(a)

| Parameter | Symbol | Value |
|---|---|---|
| Outer length | $d_{ol}$ | 49.0±1.0mm |
| Inner length | $d_{il}$ | 26.0±1.0mm |
| Outer width | $d_{ow}$ | 44.0±1.0mm |
| Inner width | $d_{iw}$ | 22.0±1.0mm |
| Thickness | $d_c$ | 1.1±0.2mm |
| Number of turns per layer | N | 11 |
| Number of layers | − | 1 |

Parameters of transmitter bottom coil (close to ferrite)

(b)

| Parameter | Symbol | Value |
|---|---|---|
| Outer length | $d_{ol}$ | 46.0±1.0mm |
| Inner length | $d_{il}$ | 21.0±1.0mm |
| Outer width | $d_{ow}$ | 49.5±1.0mm |
| Inner width | $d_{iw}$ | 25.5±1.0mm |
| Thickness | $d_c$ | 1.1±0.2mm |
| Number of turns per layer | N | 12 |
| Number of layers | − | 1 |

Parameters of transmitter top coil (close to interface)

Related U.S. Application Data

(60) Provisional application No. 62/251,118, filed on Nov. 5, 2015.

(51) Int. Cl.
| | | |
|---|---|---|
| *H01F 38/00* | (2006.01) | |
| *H02J 50/12* | (2016.01) | |
| *H02J 5/00* | (2016.01) | |
| *H01F 38/14* | (2006.01) | |
| *B60L 53/38* | (2019.01) | |
| *B60L 53/122* | (2019.01) | |
| *B60L 53/124* | (2019.01) | |
| *B60L 53/126* | (2019.01) | |
| *H02J 7/02* | (2016.01) | |
| *H02J 50/90* | (2016.01) | |

(52) U.S. Cl.
CPC ............ *B60L 53/126* (2019.02); *B60L 53/38* (2019.02); *H01F 38/14* (2013.01); *H02J 5/005* (2013.01); *H02J 7/025* (2013.01); *H02J 50/90* (2016.02)

(58) Field of Classification Search
CPC ...... B60L 53/124; B60L 53/126; B60L 53/38; B60L 53/12; H01F 38/14
See application file for complete search history.

(56) References Cited

U.S. PATENT DOCUMENTS

| | | |
|---|---|---|
| 2013/0015719 A1 | 1/2013 | Jung et al. |
| 2013/0260676 A1* | 10/2013 | Singh .................. H04B 5/0068 455/41.1 |
| 2013/0328412 A1 | 12/2013 | Meins et al. |
| 2014/0009109 A1 | 1/2014 | Lee et al. |
| 2014/0070622 A1 | 3/2014 | Keeling et al. |
| 2014/0125140 A1 | 5/2014 | Widmer et al. |
| 2015/0130409 A1 | 5/2015 | Lee et al. |
| 2015/0145635 A1* | 5/2015 | Kurz .................. H01F 27/2852 336/232 |
| 2016/0308397 A1 | 10/2016 | Jung et al. |
| 2016/0336807 A1* | 11/2016 | Mach .................. H02J 5/005 |

FOREIGN PATENT DOCUMENTS

| | | |
|---|---|---|
| JP | 2012-186949 A | 9/2012 |
| JP | 2013-70606 A | 4/2013 |
| JP | 2014-183731 A | 9/2014 |
| JP | 2015-111996 A | 6/2015 |
| JP | 2015-111997 A | 6/2015 |
| KR | 10-2012-0103309 A | 9/2012 |
| KR | 10-1213090 B1 | 12/2012 |
| KR | 10-2015-0069440 A | 6/2015 |
| KR | 10-2015-0082419 A | 7/2015 |
| KR | 10-2015-0093588 A | 8/2015 |
| WO | WO 2015/021144 A1 | 2/2015 |

* cited by examiner

| Parameter | Symbol | Value |
|---|---|---|
| Top coil is placed alongside from a bottom coil with a displacement | $d_{bt}$ | 23±2mm |
| Bottom coils are placed alongside each other with a displacement | $d_{12}$ | 46±4mm |
| Self Inductance[@1V, 100kHz] of Primary Coil | $L_P$ | 11.3±0.7μH |
| Distance from the top surface of primary coil to interface surface of base-station | $d_z$ | 5.5±1.5mm |

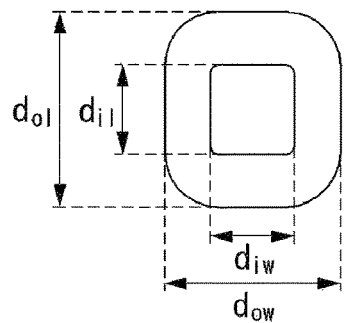

| Parameter | Symbol | Value |
|---|---|---|
| Outer length | $d_{ol}$ | 49.0±1.0mm |
| Inner length | $d_{il}$ | 26.0±1.0mm |
| Outer width | $d_{ow}$ | 44.0±1.0mm |
| Inner width | $d_{iw}$ | 22.0±1.0mm |
| Thickness | $d_c$ | 1.1±0.2mm |
| Number of turns per layer | N | 11 |
| Number of layers | - | 1 |

Parameters of transmitter bottom coil (close to ferrite)

(b)

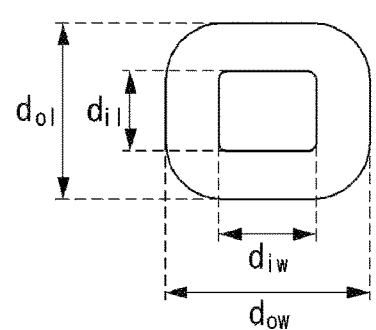

| Parameter | Symbol | Value |
|---|---|---|
| Outer length | $d_{ol}$ | 46.0±1.0mm |
| Inner length | $d_{il}$ | 21.0±1.0mm |
| Outer width | $d_{ow}$ | 49.5±1.0mm |
| Inner width | $d_{iw}$ | 25.5±1.0mm |
| Thickness | $d_c$ | 1.1±0.2mm |
| Number of turns per layer | N | 12 |
| Number of layers | - | 1 |

Parameters of transmitter top coil (close to interface)

FIG. 8A

3.3. Summary

3.3.1. Conformance to Communication Interface

*Load Modulation*

| Testcase | Name | Date | Setup | Result |
|---|---|---|---|---|
| Req #1 | Load Modulation | Oct-2015 | 003A | PASS |

3.3.2. Conformance to System Control

*Selection Phase*

| Testcase | Name | Date | Setup | Result |
|---|---|---|---|---|
| Req #2 | Interface definition requirement | Oct-2015 | 001A | N/A |

*Ping Phase*

| Testcase | Name | Date | Setup | Result |
|---|---|---|---|---|
| Req #3 | a: Power Signal Characteristics | Oct-2015 | 001A | PASS |
|  | b: Power Signal Characteristics | Oct-2015 | 001B | PASS |
|  | c: Power Signal Characteristics | Oct-2015 | 001C | PASS |
|  | d: Power Signal Characteristics | Oct-2015 | 001D | PASS |
| Req #4 | No Reponse | Oct-2015 | 001A | PASS |
| Req #5 | Signal Strength | Oct-2015 | 001A | PASS |
| Req #6 | Termination | Oct-2015 | 001A | PASS |
|  | a Termination: | Oct-2015 | 001A | PASS |
| Req #7 | a: Termination | Oct-2015 | 001A | PASS |
|  | b: Termination | Oct-2015 | 001A | PASS |
|  | c: Termination |  |  |  |

*Identification and Configuration Phase*

| Testcase | Name | Date | Setup | Result |
|---|---|---|---|---|
| Req #8 | a: Packet Sequence | Oct-2015 | 001A | PASS |
|  | b: Packet Sequence | Oct-2015 | 001A | PASS |
|  | c: Packet Sequence | Oct-2015 | 001A | PASS |
|  | d: Packet Sequence | Oct-2015 | 001A | PASS |
| Req #9 | Packet Timing | Oct-2015 | 001A | PASS |
| ~~Req #10~~ | ~~Packet Timing~~ | Oct-2015 | 001A | N/A |
| Req #11 | Communication Error | Oct-2015 | 001A | PASS |
| ~~Req #12~~ | ~~Packet Content~~ | Oct-2015 | 001A | N/A |
| Req #13 | Packet Content | Oct-2015 | 001A | PASS |
|  | a: Packet Content | Oct-2015 | 001A | PASS |
|  | b: Packet Content | Oct-2015 | 001A | PASS |
|  | c: Packet Content | Oct-2015 | 001A | PASS |
| Req #14 | Packet Content | Oct-2015 | 001A | PASS |
| ~~Req #15~~ | ~~Power Transfer Contract~~ | Oct-2015 | 001A | N/A |

FIG. 8B

Power Transfer Phase

| Testcase | Name | Date | Setup | Result |
|---|---|---|---|---|
| Req #16 | Packet Sequence | Oct-2015 | 001A | PASS |
|  | a: Packet Sequence | Oct-2015 | 001A | PASS |
|  | b: Packet Sequence | Oct-2015 | 001A | PASS |
| Req #17 | a: Packet Timing | Oct-2015 | 001A | PASS |
|  | b: Packet Timing | Oct-2015 | 001A | PASS |
| Req #18 | Packet Timing | Oct-2015 | 001A | PASS |
| Req #19 | Packet Content | Oct-2015 | 001A | N/A |
| Req #20 | a: Power Control | Oct-2015 | 001B | PASS |
|  | b: Power Control | Oct-2015 | 001B | PASS |
| Req #21 | Power Control | Oct-2015 | 001B | PASS |
| Req #22 | Termination | Oct-2015 | 001A | PASS |
|  | a: termination | Oct-2015 | 001A | PASS |

3.3.3. Conformance to System Performance

Guaranteed Power

| Testcase | Name | Date | Setup | Result |
|---|---|---|---|---|
| Req #23 | a: Guaranteed Power | Oct-2015 | 001A | PASS |
|  | b: Guaranteed Power | Oct-2015 | 001B | PASS |
|  | c: Guaranteed Power | Oct-2015 | 001C | PASS |
|  | d: Guaranteed Power | Oct-2015 | 001D | PASS |
|  | e: Guaranteed Power | Oct-2015 | 001E | PASS |
|  | f: Guaranteed Power | Oct-2015 | TPR#6 | PASS |

Thermal Performance

| Testcase | Name | Date | Setup | Result |
|---|---|---|---|---|
| Req #24 | Thermal Performance | Oct-2015 | 002A | N/A |

Foreign Object Detection

| Testcase | Name | Date | Setup | Result |
|---|---|---|---|---|
| Req #25 | a: Performance requirement | Oct-2015 | TPR#5 | PASS |
|  | b: Performance requirement | Oct-2015 | TPR#5 | PASS |
|  | c: Performance requirement | Oct-2015 | TPR#5 | PASS |
|  | d: Performance requirement | Oct-2015 | TPR#5 | PASS |

User Interface

| Testcase | Name | Date | Setup | Result |
|---|---|---|---|---|
| Req #26 | Object Placed | Oct-2015 | 001A | PASS |
| Req #27 | Transfer in Progress | Oct-2015 | 001A | N/A |
| Req #28 | Transfer Complete | Oct-2015 | 001A | PASS |
| Req #29 | Fault | Oct-2015 | 001A | PASS |
| Req #30 | Multiple Devices | Oct-2015 | 001A | N/A |
| Req #31 | Performance requirement | Oct-2015 | 001A | N/A |

| Measurements | Vr (V) |
|---|---|
| #1 | 4.202 |
| #2 | 4.188 |
| #3 | 4.196 |
| Average | 4.195 |

Test Result (: Pass / Fail (b)

| Measurements | Vr (V) |
|---|---|
| #1 | 6.917 |
| #2 | 6.923 |
| #3 | 6.945 |
| Average | 6.928 |

Test Result : Pass /(Fail)

(c)

| Measurements | Vr (V) |
|---|---|
| #1 | 4.205 |
| #2 | 4.197 |
| #3 | 4.201 |
| Average | 4.201 |

Test Result (: Pass)/ Fail (d)

| Measurements | Vr (V) |
|---|---|
| #1 | 7.464 |
| #2 | 7.524 |
| #3 | 7.489 |
| Average | 7.492 |

Test Result : Pass /(Fail)

(e)

| Measurements | Vr (V) |
|---|---|
| #1 | 5.015 |
| #2 | 5.004 |
| #3 | 4.986 |
| Average | 5.002 |

Test Result (: Pass)/ Fail (f)

| Measurements | Vr (V) |
|---|---|
| #1 | 5.007 |
| #2 | 4.982 |
| #3 | 4.969 |
| Average | 4.986 |

Test Result (: Pass)/ Fail (a) 8W (b) 15W (a) 12W (b) 15W

FIG. 12

|  | Distance | FO Temp. | Criteria |
|---|---|---|---|
| Test #25(a) | 0 mm | 45°C | ≤60°C |
|  | 2 mm | 49°C |  |
|  | 5 mm | No charging |  |
| Test #25(b) | 0 mm | 44°C | ≤60°C |
|  | 2 mm | 48°C |  |
|  | 5 mm | No charging |  |
| Test #25(c) | 0 mm | No charging | ≤60°C |
|  | 2 mm | No charging |  |
|  | 5 mm | No charging |  |
| Test #25(d) | 0 mm | No charging | ≤80°C |
|  | 2 mm | No charging |  |
|  | 5 mm | No charging |  |

Test Result : (Pass) / Fail

WIRELESS POWER TRANSMITTER AND RECEIVER FOR VEHICLE

CROSS-REFERENCE TO RELATED APPLICATIONS

This application is a Continuation of U.S. patent application Ser. No. 15/541,180 filed on Jun. 30, 2017, which is the National Phase of PCT International Application No. PCT/KR2016/012682 filed on Nov. 4, 2016, which claims the priority benefit under 35 U.S.C. § 119(e) to U.S. Provisional Application No. 62/251,118 filed on Nov. 5, 2015, all of which are hereby expressly incorporated by reference into the present application.

BACKGROUND OF THE INVENTION

Field of the Invention

The present invention relates to a structure for a wireless power transmitter and receiver for a vehicle and a method for controlling the same.

Discussion of the Related Art

A contactless wireless charging method is an energy transfer method for electromagnetically transferring energy without using a wire in a method for sending energy through an existing wire so that the energy is used as power for an electronic device. The contactless wireless transmission method includes an electromagnetic induction method and a resonant method. In the electromagnetic induction method, a power transmission unit generates a magnetic field through a power transmission coil (i.e., a primary coil), and a power reception coil (i.e., a secondary coil) is placed at the location where an electric current may be induced so that power is transferred. In the resonant method, energy is transmitted using a resonant phenomenon between the transmission coil and the reception coil. In this case, a system is configured so that the primary coil and the secondary coil have the same resonant frequency, and resonant mode energy coupling between the transmission and reception coils is used.

SUMMARY OF THE INVENTION

The present invention provides a novel coil assembly structure for a wireless power transmitter for a vehicle that has good charging efficiency/performance, and a method of operating such a wireless power transmitter for a vehicle.

An embodiment of the present invention provides a wireless power transmitter for a vehicle that transfers power to a wireless power receiver, including: a coil assembly comprising first and second bottom coils placed adjacent to each other in a line and each consisting of a single layer of 11 turns and a top coil stacked on the first and second bottom coils and consisting of a single layer of 12 turns; and a full-bridge inverter driving each of coils included in the coil assembly individually, wherein the first and second bottom coils and the top coil have a substantially rectangular frame structure with a through hole in the center, the top coil lies on a plane surface in the middle between the first and second bottom coils, and a distance from the center of the first and second bottom coils to the center of the top coil is set to a range of 23 mm to 25 mm.

Also, a level of power transferred to the wireless power receiver by the coil assembly may be controlled based on a level of input voltage applied to the full-bridge inverter.

Also, the level of voltage applied to the full-bridge inverter may be adjusted within a range of 1 V to 18 V.

Also, an operating frequency of the coil assembly may be fixed within a range of 140 to 150 kHz.

Also, the first and second bottom coils may have a height of 48 mm to 50 mm and a width of 47 mm to 49 mm, and the through hole in the first and second bottom coils may have a height and width of 18 mm to 20 mm.

Also, the top coil may have a height of 45 mm to 47 mm and a width of 48.5 mm to 50.5 mm, and the through hole in the first and second coils may have a height of 20 mm to 22 mm and a width of 24.5 mm to 26.5 mm.

Also, a thickness of the first and second bottom coils and the top coil may be set to a range of 0.9 mm to 1.3 mm.

Also, the first and second bottom coils and the top coil may have the same inductance value.

Also, the first and second bottom coils and the top coil may have the same inductance value within a range of 10.6 µH to 12.0 µH.

According to an embodiment of the present invention, the application of a multi-coil driving scheme to a coil assembly widens the chargeable area but minimizes the unchargeable area, thereby increasing the charging performance/efficiency.

Also, according to an embodiment of the present invention, it is possible to prevent frequency interference with other electronic parts/equipment within the vehicle as the power transmitter operates at a fixed operating frequency.

Also, according to an embodiment of the present invention, the power transmitter has a very wide adjustable input voltage range of 1 V to 18 V, and supports high input voltage, thus increasing the z distance $d\_z$ and enabling long-distance charging. This gives vehicle manufacturers a greater degree of freedom in the installation of a power transmitter in a vehicle.

Other advantages of embodiments of the present invention will be described below in detail.

BRIEF DESCRIPTION OF THE DRAWINGS

FIG. 5 illustrates a coil structure in accordance with an embodiment of the present invention.

FIGS. 8A, 8B and 9 show test results of the power transfer performance of a power transmitter designed in accordance with an embodiment of the present invention.

FIGS. 12 and 13 show test results of the thermal performance of a power transmitter designed in accordance with an embodiment of the present invention.

DETAILED DESCRIPTION OF THE EMBODIMENTS

Figure 1:
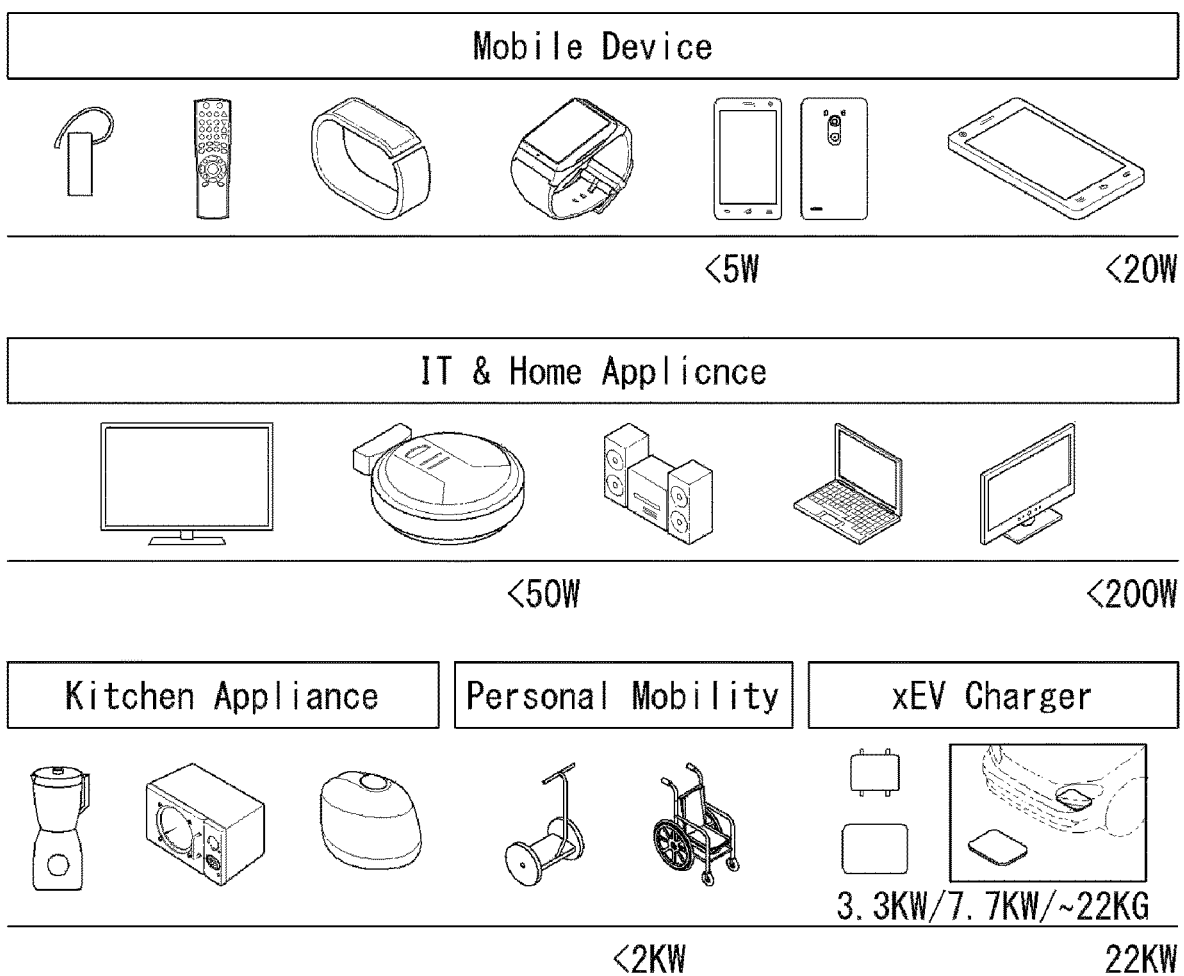
FIG. 1 shows an embodiment of various electronic devices into which a wireless charging system is introduced.

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names, but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

For the standardization of wireless power transmitter/receivers, Wireless Power Consortium (WPC) standardizes technologies related to wireless power transmission/reception.

A recently developed wireless charging system may support the transmission/reception of low power of about 5 W. In this case, there is a problem in that a charging time is long and efficiency is low in such a low power charging method because the size of a mobile device and the capacity of a battery are recently increased. Accordingly, a wireless charging system supporting the transmission/reception of middle power of about 15 W~20 W is developed. Furthermore, in order to improve charging efficiency, a wireless charging system to which a resonant method for simultaneously charging a plurality of electronic devices has been added is developed.

An embodiment of the present invention relates to a wireless charging system to which the resonant method has been added and proposes a wireless charging transmitter/receiver using the resonant method, which is compatible with a wireless charging transmitter/receiver using an electromagnetic induction method supporting low power/middle power.

A wireless power transmitter and wireless power receiver of a resonant type proposed by an embodiment of the present invention and a wireless charging method and a communication protocol using the wireless power transmitter and wireless power receiver are described below. Furthermore, a wireless power transmitter may be abbreviated as a power transmitter or a transmitter, and a wireless power receiver may be abbreviated as a power receiver or a receiver.

FIG. 1 shows an embodiment of various electronic devices into which a wireless charging system is introduced.

FIG. 1 shows that electronic devices are classified depending on an amount of power that is transmitted and received in a wireless charging system.

Referring to FIG. 1, a small power (about 5 W or less or about 20 W or less) wireless charging method may be applied to wearable devices, such as a smart watch, smart glass, a head mounted display (HMD), and a smart ring, and mobile electronic devices (or portable electronic devices), such as an earphone, a remote controller, a smart phone, a PDA, and a tablet PC. A middle power (about 50 W or less or about 200 W or less) wireless charging method may be applied to middle/small-sized home appliances, such as a notebook computer, a robot clearer, a TV, an audio equipment, a vacuum and a monitor. A large power (about 2 kW or less or 22 kW or less) wireless charging method may be applied to kitchen equipment, such as a mixer, a microwave, and an electric rice cooker, and personal mobile devices (or electronic devices/mobile means), such as a wheel chair, an electric kickboard, an electric bicycle, and an electric vehicle.

Each of the aforementioned electronic devices/mobile means (or shown in FIG. 1) may include a wireless power receiver to be described later. Accordingly, the aforementioned electronic devices/mobile means may be wirelessly charged with power received from a wireless power transmitter.

Hereinafter, a mobile device to which the small wireless charging method is applied is chiefly described for convenience of description, but this is only an embodiment. A wireless charging method in accordance with an embodiment of the present invention may be applied to the aforementioned various electronic devices.

Figure 2:
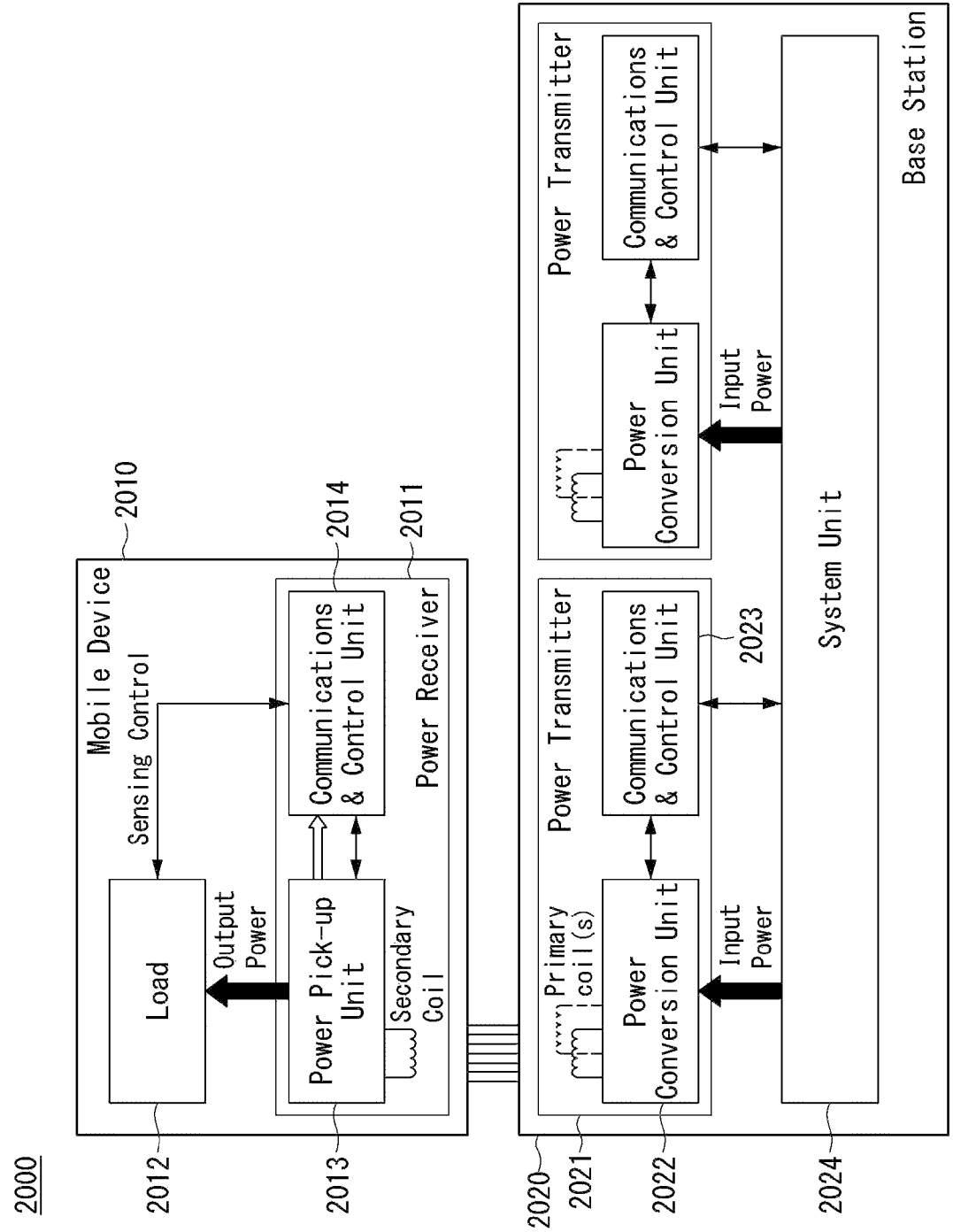
FIG. 2 is a block diagram of a wireless power transmission/reception system in accordance with an embodiment of the present invention.

FIG. 2 is a block diagram of a wireless power transmission/reception system in accordance with an embodiment of the present invention.

Referring to FIG. 2, a wireless power transmission/reception system 2000 includes a mobile device 2010 configured to wirelessly receive power and a base station 2020 configured to wirelessly transfer (or transmit) power. Hereinafter, the mobile device may also be called a "power receiver product", and the base station may also be called a "power transmitter product."

The mobile device 2010 includes a power receiver 2011 for wirelessly receiving power through a secondary coil and a load 2012 for receiving power received by the power receiver 2011, storing the received power, and supplying the stored power to a device.

The power receiver 2011 may include a power pick-up unit 2013 and a communications & control unit 2014. The power pick-up unit 2013 may receive a wireless power signal through the secondary coil and convert the received signal into electric energy. The communications & control unit 2014 may control the transmission/reception of a power signal (or power).

The base station 2020 is a device for providing inductive power or resonant power, and may include at least one power transmitter 2021 or a system unit 2024.

The power transmitter 2021 may send inductive power or resonant power and control such transmission. The power transmitter 2021 may include a power conversion unit 2022 configured to convert electric energy into a power signal by generating a magnetic field through a primary coil(s) and a communications & control unit 2023 configured to control communication and power transfer with the power receiver 2011 so that power of a proper level is transferred. The system unit 2024 may perform control of other operations of the base station 2020, such as input power provisioning, control of a plurality of power transmitters, and control of a user interface.

The power transmitter 2021 may control transmission power by controlling an operating point. The controlled operating point may correspond to a combination of a frequency (or phase), a duty cycle, a duty ratio, and voltage amplitude. The power transmitter 2021 may control transmission power by controlling at least one of a frequency (or phase), a duty cycle, a duty ratio, or voltage amplitude.

Furthermore, the power transmitter 2021 may supply constant power, and the power receiver 2011 may control reception power by controlling a resonant frequency.

In this specification, a (primary/secondary) coil or a coil unit may also be called a coil assembly, a coil cell, or a cell which includes a coil and at least one element close to the coil.

Figure 3:
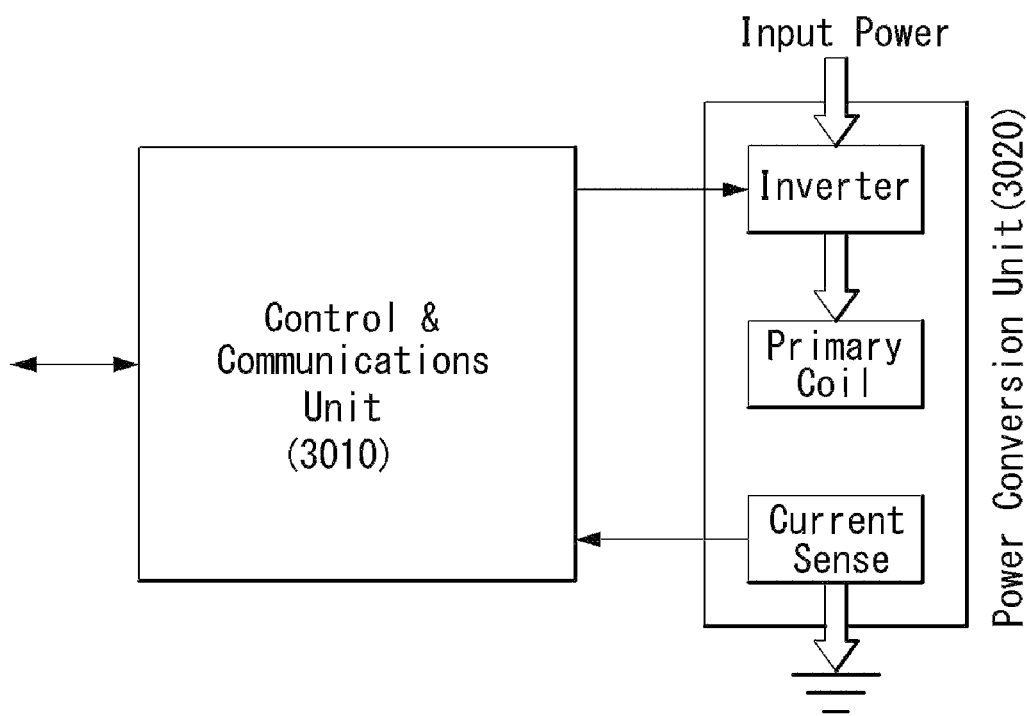
FIG. 3 is a block diagram of a power transmitter in accordance with an embodiment of the present invention.

FIG. 3 is a block diagram of a power transmitter in accordance with an embodiment of the present invention.

Referring to FIG. 3, the power transmitter 3000 may include two main units: a power conversion unit 3020 and a communications & control unit 3010. The power conversion unit 3020 may perform communication with the communications & control unit 3010.

The power conversion unit 3020 may be in charge of/include the analog part of a power transmitter design. The power conversion unit 3020 may include an inverter, a primary coil selection block, and/or a current sense unit. The power conversion unit 3020 (or inverter) may receive DC (direct current) input and convert it to an AC waveform for operating a resonant circuit including a series capacitor and a primary coil(s). Here, the primary coil may refer to a coil that is appropriately selected from among at least one coil in the power transmitter depending on the location of the power receiver, in order to charge the power receiver.

The power conversion unit 3020 (or coil selection block) may select at least one coil in a proper position to charge the power receiver, from among the coils included in a coil assembly, depending on the location of the power receiver placed on the coil assembly.

Coil selection may be done/performed in real time by the power transmitter 3000 (or power conversion unit 3020/coil selection block) by performing/attempting communication with the power receiver using at least one coil included in the coil assembly (or all the coils in sequence). That is, the power transmitter 3000 (or power conversion unit 3020/coil selection block) may find the location of the power receiver by performing communication with the power receiver using at least one coil, and may select one coil corresponding to the location of the power receiver, For example, the power transmitter 3000 (or power conversion unit 3020/coil selection block) may attempt communication with the power receiver using at least one coil included in the coil assembly, and it can be assumed that an attempt to communicate with the power receiver using the first coil among them has succeeded. In this case, the power transmitter 3000 (or power conversion unit 3020/coil selection block) may determine/predict that the power receiver is currently placed on the first coil (or closest to the first coil), and may select the first coil as a coil to be driven for charging the power receiver.

Alternatively, although not shown in the drawing, the power transmitter 3000 may have a separate sensor (e.g., a proximity sensor, infrared sensor, etc.) for finding the location of the power receiver. In this case, the power transmitter 3000 may find the location of the power receiver by using the corresponding sensor, and may select a coil in a proper position to charge the power receiver as a drive coil.

Lastly, the power conversion unit 3020 (or current sense unit) may continuously monitor the current flowing through a selected coil.

The communications & control unit 3010 may be in charge of/include the digital logic part of a power transmitter design including a coil assembly.

More specifically, the communications & control unit 3010 may receive and decode a message from the power receiver, constitute a coil selection block to connect with a proper coil, and execute a power control algorithm/protocol related to the coil selection block. Moreover, the communications & control unit 3010 may control/drive the frequency of an AC waveform for controlling power transfer. In addition, the communications & control unit 3010 may interface with other subsystems of the base station (for the purpose of user interfacing, for example).

Although this block diagram shows and describes the power conversion unit 3000 and the communications & control unit 3010 separately, the present invention is not limited to this and at least one of the functions of the power conversion unit 3000 may be performed by the communications & control unit 3010 or at least one of the functions of the communications & control unit 3010 may be performed by the power conversion unit 3000. Furthermore, the power conversion unit 3000 and the communications & control unit 3010 may be configured as separate chips or built into one chip.

So far, the block diagram of the power transmitter 3000 in accordance with an embodiment of the present invention has been described. Below is a description of a coil assembly structure that may be included in the power transmitter 3000.

Figure 4:
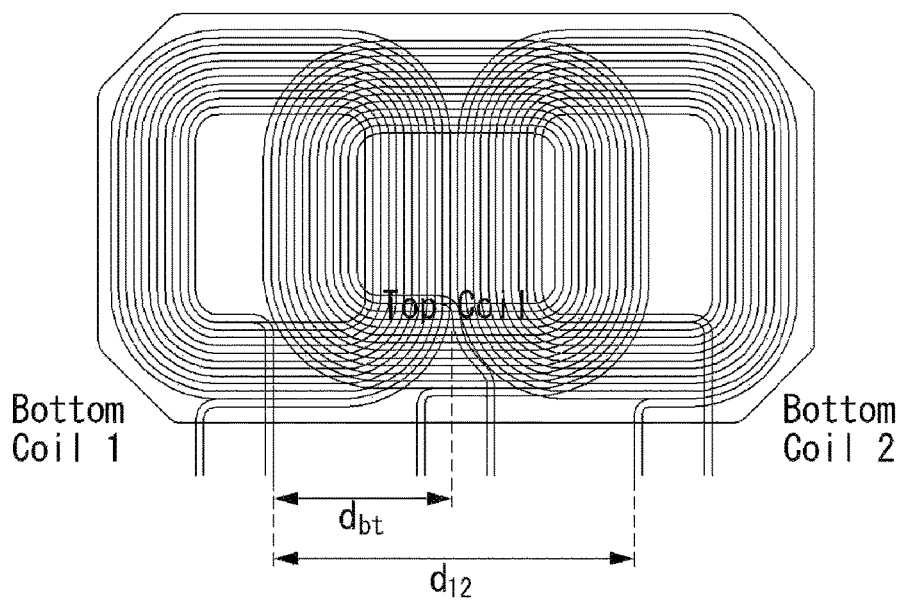
FIG. 4 is a diagram illustrating a coil assembly structure for a power transmitter in accordance with an embodiment of the present invention.

FIG. 4 is a diagram illustrating a coil assembly structure for a power transmitter in accordance with an embodiment of the present invention.

Referring to FIG. 4, the coil assembly for a power transmitter in accordance with an embodiment of the present invention may include three coils. Each of the three coils may have a substantially rectangular frame structure with a through hole in the center.

The coil assembly may include two bottom coils (or referred to as "bottom primary coils") arrayed and placed in a line and a top coil (or referred to as "top primary coil") placed on (or over) the bottom coils. In other words, the coil assembly may have a stack structure of a plurality of coils stacked on a plane surface to overlap, with the bottom coils being arranged on a first layer, and the top coil being stacked on the first layer.

If one of the two bottom coils included in the coil assembly is referred to as a first bottom coil and the other as a second bottom coil, the distance $d\_12$ from the center of the first bottom coil to the center of the second bottom coil may be about 46±4 mm. The top coil may be placed orthogonal to the bottom coils, and may lie in the middle between the two bottom coils arrayed in a line. The distance $d\_bt$ from the center of the first and/or second bottom coil to the center of the top coil may be about 23±2 mm. Although not shown in this drawing, the distance $d\_z$ from the top surface of the coil assembly (or the top surface of the top coil) to the interface surface of the base station may be about 5.5±1.5 mm. Here, the interface surface may refer to a flat surface closest to the primary coils, among a plurality of surfaces constituting the base station, or refer to a flat surface closest to the secondary coil, among the surfaces of the mobile device. The self inductance $L\_p$ of each coil (or primary coil) may be about 11.3±0.7 µH.

The following is a more detailed description of a structure of each of the coils (or primary coils—i.e., the bottom coils and the top coil) constituting the coil assembly proposed in this specification.

FIG. 5 illustrates a coil structure in accordance with an embodiment of the present invention. Specifically, FIG. 5(*a*) is a diagram illustrating a bottom coil structure, and FIG. 5(*b*) is a diagram illustrating a top coil structure. Hereinafter (or in this specification), the bottom coil and the top coil will be commonly referred to as "primary coils" for convenience of explanation.

The primary coils may be wire-wound type, and may consist of a 17 AWG (American wire gauge) litz wire made from 105 strands of 40 AWG wire (0.08 mm in diameter), or a litz wire of similar type or structure. As previously described, the primary coils may include two types of rectangular coils (bottom coil and top coil), and each coil may consist of a single layer. Each primary coil may be designed to have the same inductance value so as to be independent from the distance from ferrite.

The bottom coil may be placed close to the ferrite in the power transmitter, and the bottom coil may have specific parameter values as presented in the table shown in FIG. 5(a).

Referring to the table shown in (a) of FIG. 5, the bottom coil may be designed to have an outer length (or outer height) d_ol of about 49.0±1.0 mm, an inner length (or inner height) d_il of about 26.0±1.0 mm (or about 19.0±1.0 mm), an outer width d_ow of about 44.0±1.0 mm (or about 48.0±1.0 mm), an inner width d_iw of about 22.0±1.0 mm (or about 19.0±1.0 mm), and a thickness d_c of about 1.1±0.2 mm. The bottom coil may be designed to have a single-layer structure, and the number N of turns per layer in the bottom coil may be 11.

The top coil may be placed close to the interface of the power transmitter, and the top coil may have specific parameter values as presented in the table shown in FIG. 5(b).

Referring to the table shown in FIG. 5(b), the top coil may be designed to have an outer length (or outer height) d_ol of about 46.0±1.0 mm, an inner length (or inner height) d it of about 21.0±1.0 mm, an outer width d_ow of about 49.5±1.0 mm, an inner width d_iw of about 25.5±1.0 mm, and a thickness d_c of about 1.1±0.2 mm. The top coil may be designed to have a single-layer structure, and the number N of turns per layer in the top coil may be 12.

Figure 6:
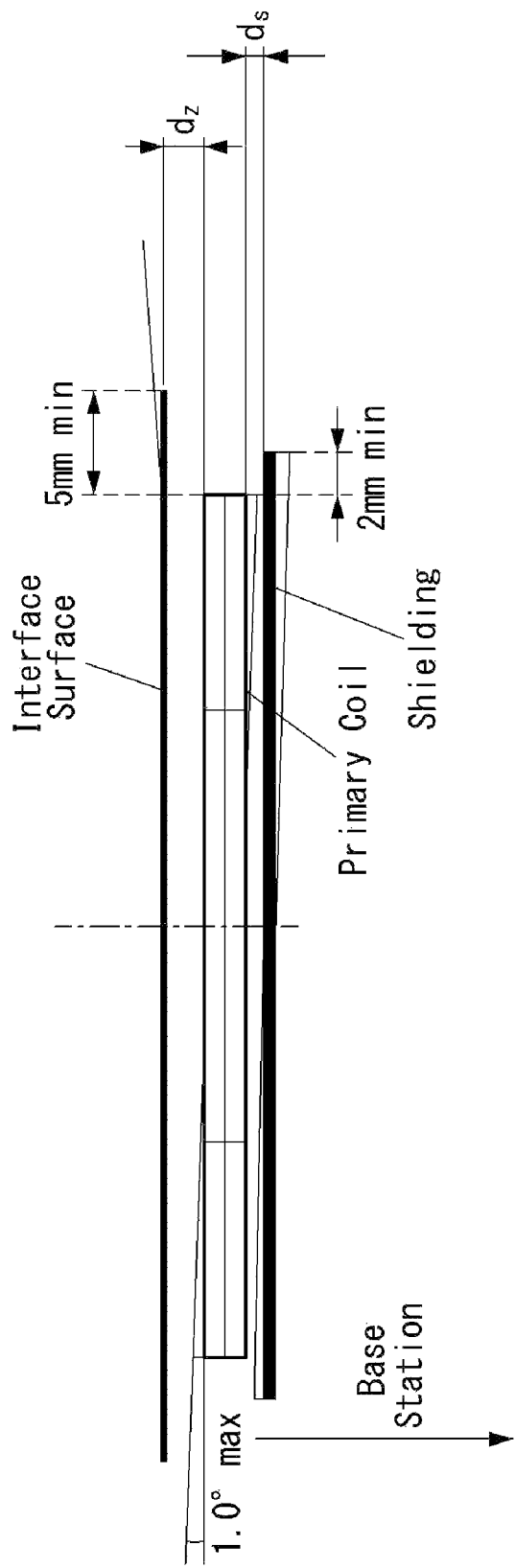
FIG. 6 is a diagram illustrating a shielding structure that covers a coil assembly in accordance with an embodiment of the present invention.

FIG. 6 is a diagram illustrating a shielding structure that covers a coil assembly in accordance with an embodiment of the present invention.

Referring to FIG. 6, a soft magnetic material may protect and cover the base station from magnetic fields generated by the primary coils. The shielding may extend a minimum of 2 mm beyond the outer edges of the primary coils and be a minimum of 2 mm thick. The shielding may be provided below the primary coils and have a distance d_s of maximum 1.0 mm from the primary coils. The shielding may be made of manganese-zinc (MnZn) ferrite (e.g., PM12 of Todaisu).

The distance d_z (or z distance) from the top face of the primary coils to the interface surface of the base station may be about 1.1±0.2 mm. The interface surface of the base station may be designed to extend a minimum of 5 mm beyond the outer edges of the primary coils.

Figure 7:
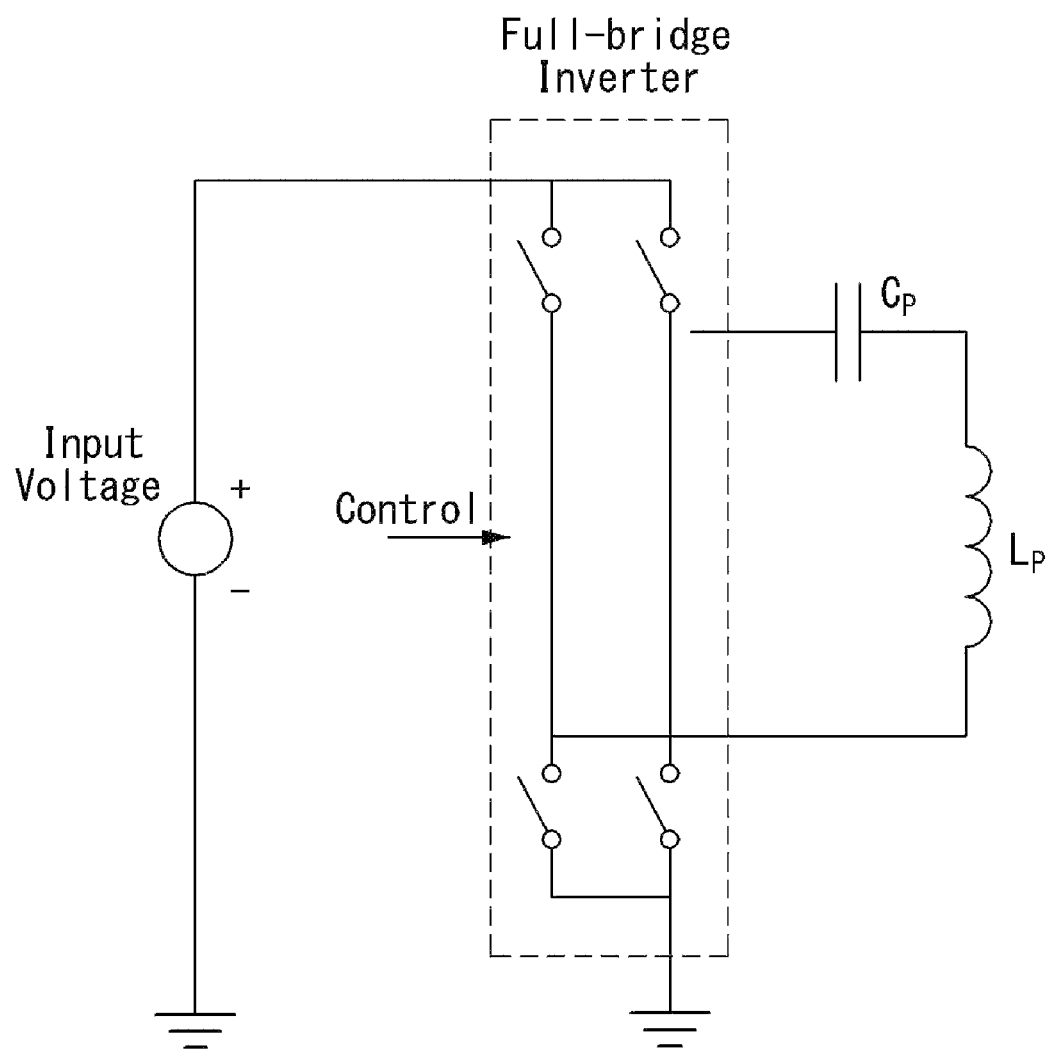
FIG. 7 is a diagram illustrating an equivalent circuit of a power transmitter in accordance with an embodiment of the present invention.
Figure 10A:
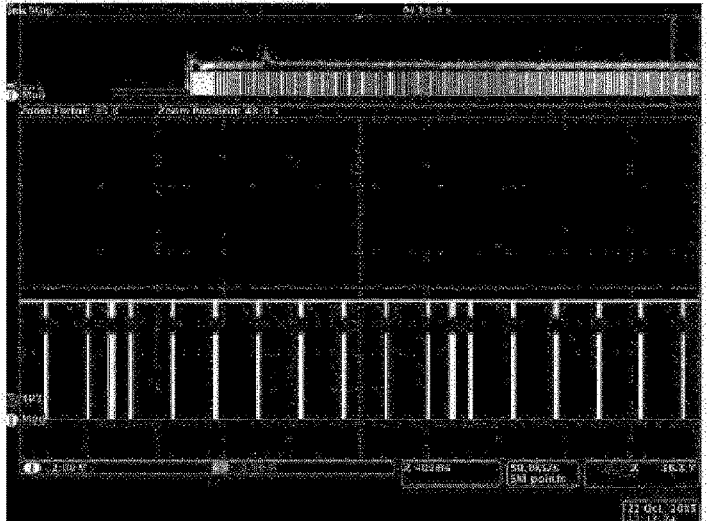
FIGS. 10A, 10B, 11A and 11B show test results of the transmit power level adjustment function of a power transmitter designed in accordance with an embodiment of the present invention.
Figure 10B:
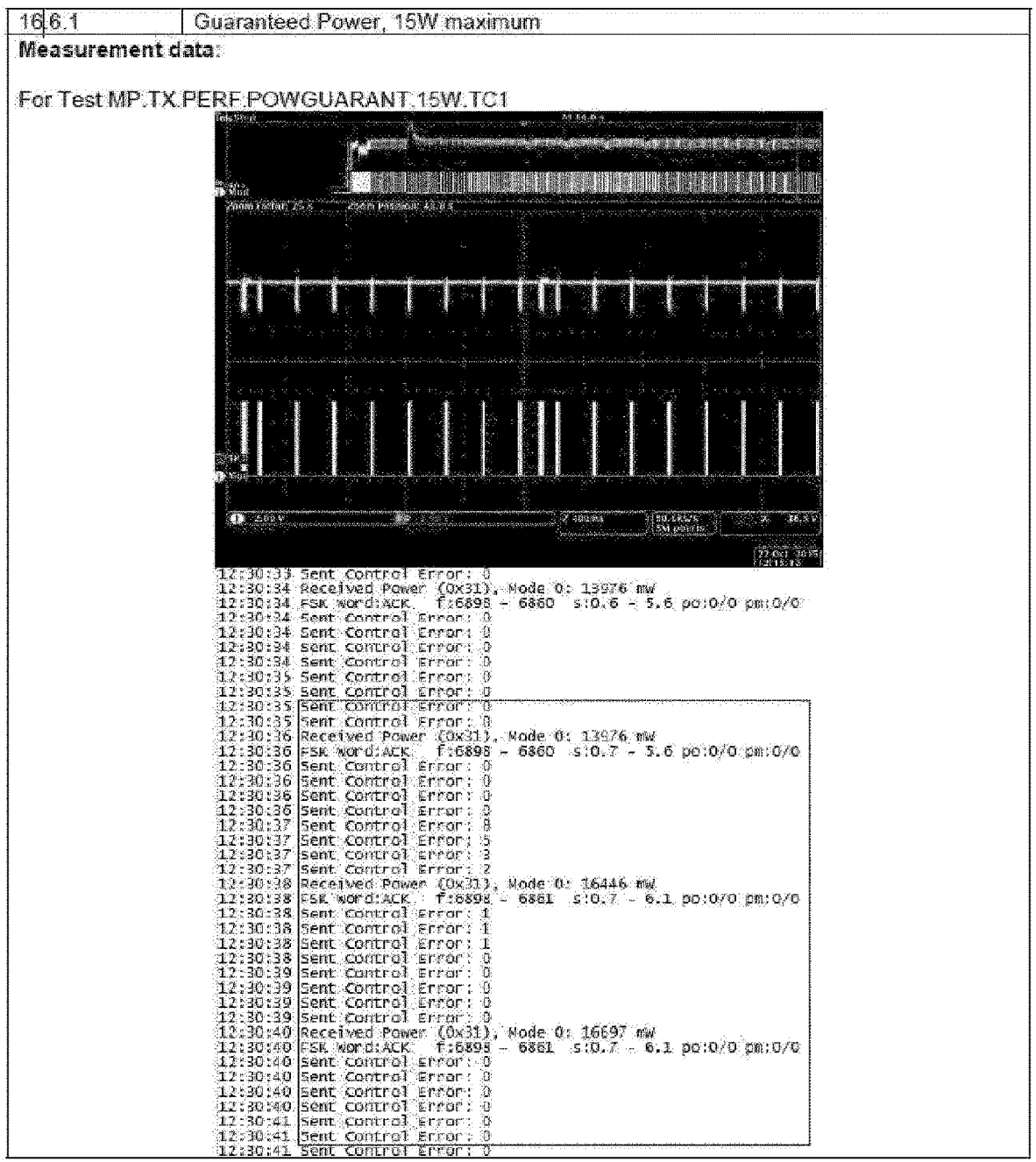
Figure 11A:
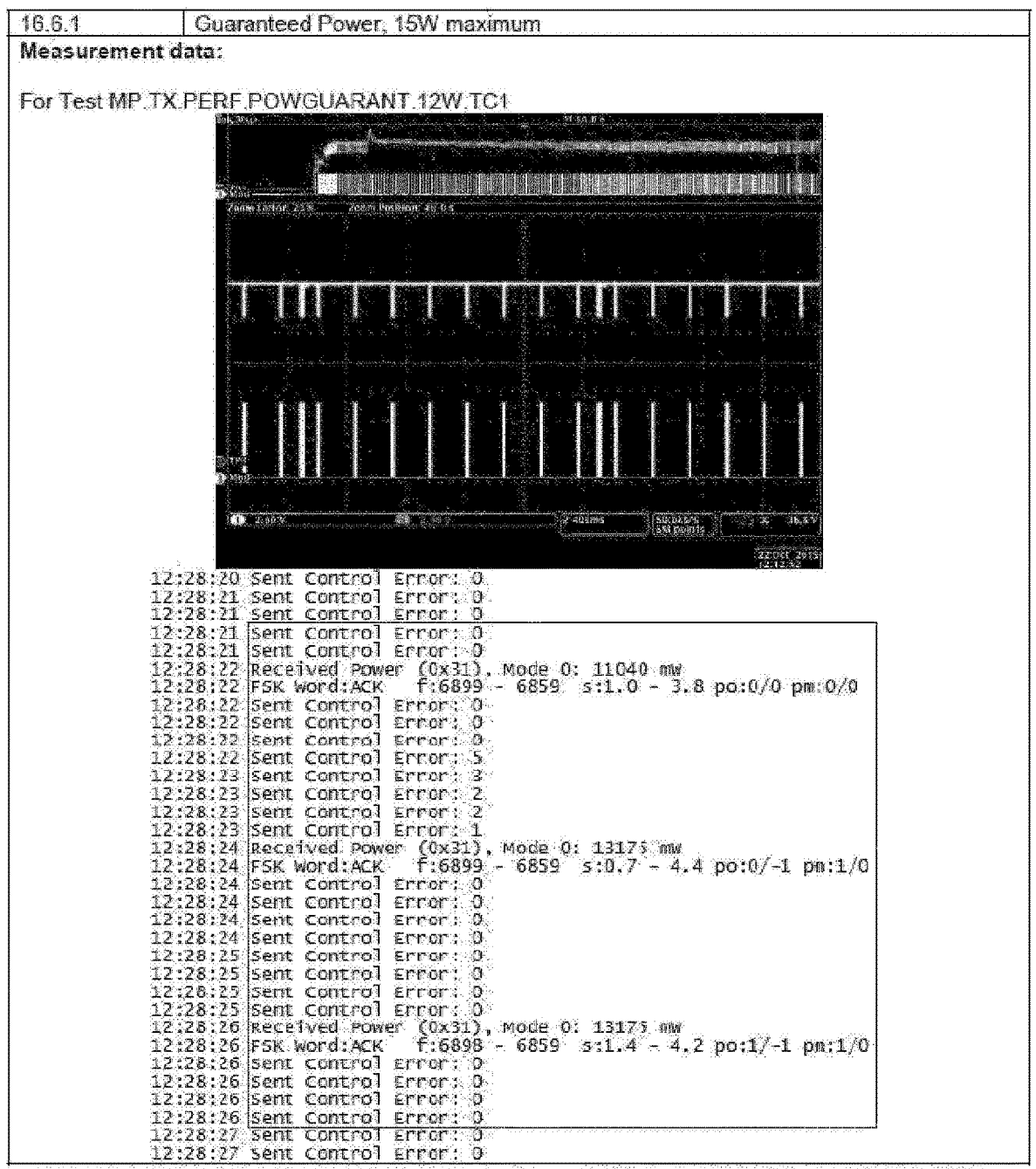
Figure 11B:
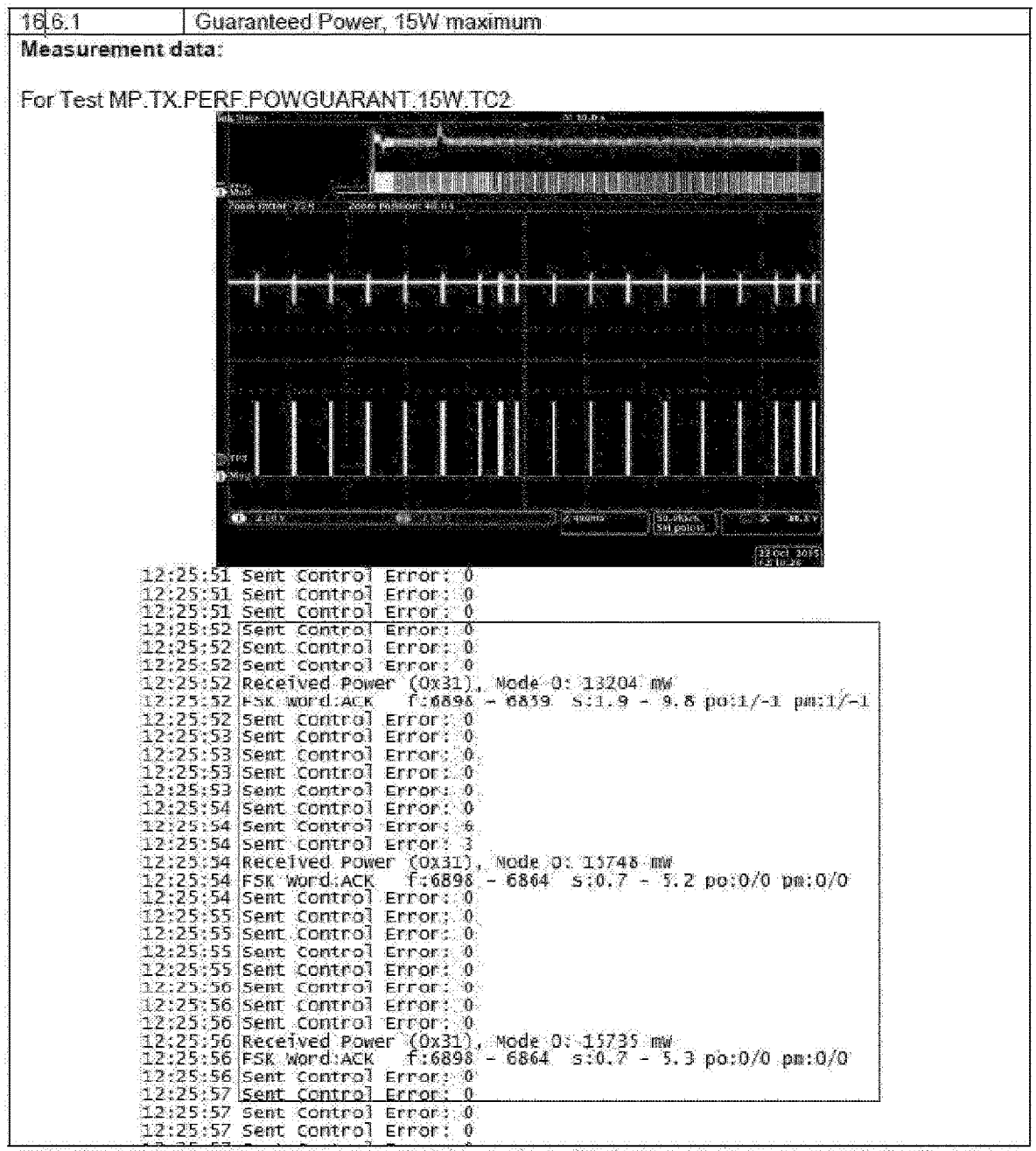

FIG. 7 is a diagram illustrating an equivalent circuit of a power transmitter in accordance with an embodiment of the present invention.

Referring to FIG. 7, the power transmitter (or coil assembly drive circuit) in accordance with an embodiment of the present invention may use/include a full-bridge inverter (hereinafter, abbreviated as "inverter") for driving individual primary coils and a series capacitor C_p. This full-bridge inverter concept may correspond to the above-described power conversion unit or be included in it.

The coil assembly and the shielding may be designed to have a magnetic inductance L_p of about 11.3±0.7 µH (i.e., 10.6~12.0 µH), and the series capacitor C_p may be designed to have a capacitance of about 139±6% µH (i.e., 133~147 nF).

The power transmitter (or communications & control unit) may control the input voltage applied to the inverter in order to control the amount of power transmitted to the power receiver. More particularly, the power transmitter (or communications & control unit) may control the input voltage applied to the inverter over the range of 1 V to 18 V, with a resolution of 10 mV. The inverter may operate in mid-power mode and low-power mode. The operating frequency f_op of the power transmitter (or coil assembly) may be substantially fixed at about 140 to 150 kHz, with a duty cycle of 50%. As used herein, the operating frequency may mean the oscillation frequency of a voltage/power signal applied to drive/operate the power transmitter (or coil assembly). An external voltage applied to the power transmitter may range from 10 V to 14 V (generally, 12 V).

In a case where the power transmitter (or communications & control unit) transmits/applies a power signal (e.g., digital ping signal), an initial voltage of about 5.0±0.5 V may be used to the bottom and top coils, and the operating frequency used may be in the range of 140 kHz to 150 kHz—for example, 145 kHz.

Control of the power transmitter (or communications & control unit) may be performed using a proportional integral differential (PID) algorithm. As used herein, the PID algorithm (or PID controller) denotes an algorithm that basically takes the form of a feedback controller, calculates an error value by measuring an output value of an object intended to be controlled and comparing the measured output value to a reference value or setpoint, and derives a control value required by using the error value.

To ensure accurate power control, the power transmitter (or communications & control unit) may determine the amplitude of primary cell current (same as primary coil current) with a resolution of about 7 mA.

Tables 1 and 2 below show parameter values that may be used in the TID algorithm.

TABLE 1

| Parameter | Symbol | Value | Unit |
|---|---|---|---|
| Proportional gain | Krp | 10 | $mA^{-1}$ |
| Integral gain | Kri | 1 | $mA^{-1} ms^{-1}$ |
| Derivative gain | Krd | 0 | $mA^{-1} ms$ |
| Integral term upper limit | Mriu | 3000 | N.A. |
| Integral term lower limit | Mril | −3000 | N.A. |
| PID output upper limit | Mrupid | 20000 | N.A. |
| PID output upper limit | Mrlpid | −20000 | N.A. |
| PID Scaling Factor | Krpid | 100 | N.A |

TABLE 2

| Parameter | Symbol | Value | Unit |
|---|---|---|---|
| Proportional gain | Kdp | 30 | $mA^{-1}$ |
| Integral gain | Kdi | 1 | $mA^{-1} ms^{-1}$ |
| Derivative gain | Kdd | 0 | $mA^{-1} ms$ |
| Integral term upper limit | Mdiu | 3000 | N.A. |
| Integral term lower limit | Mdil | −3000 | N.A. |
| PID output upper limit | Mdupid | 20000 | N.A. |
| PID output upper limit | Mdlpid | −20000 | N.A. |
| PID Scaling Factor | Kdpid | 15 | N.A |

With all of the above considered, the power transmitter (or a power transmitter circuit or the communications & control unit) in accordance with an exemplary embodiment of the present invention may control the power transferred to the power receiver by controlling the input voltage applied to the inverter. In this case, a substantially fixed operating frequency, adjustable only in the range of about 140 kHz to 150 kHz, may be used. The adjustable input voltage range is 1 V to 18 V, which is much wider than the range of input voltage applied to the inverter from other power transmitters. With this feature, the power transmitter of this invention has the following advantages and effects when used as a wireless power transmitter for a vehicle.

One of the advantages is that it is possible to prevent frequency interference with other electronic parts/equipment within the vehicle as the power transmitter operates at a fixed operating frequency. Frequency interference between the power transmitter and other electronic parts/equipment may cause safety issues critical for the driver's life and safety. Accordingly, unlike other general power transmitters, a power transmitter for a vehicle proposed in this invention may regulate the transferred power by controlling the input voltage instead of the operating frequency.

Another advantage is that the power transmitter has a very wide adjustable input voltage range of 1 V to 18 V, and supports high input voltage, thus increasing the z distance d_z and enabling long-distance charging. This gives vehicle manufacturers a greater degree of freedom in the installation of a power transmitter in a vehicle.

As such, the power transmitter designed as shown in FIGS. 4 to 7 may be made and used as a low-power transmitter for a vehicle that enables low-power charging at about 5 W or as a medium-power transmitter for a vehicle that enables wireless power charging at about 15 W.

Now, test results of the power transfer performance of the power transmitter designed as shown in FIGS. 4 to 7 will be discussed.

FIGS. 8A, 8B and 9 show test results of the power transfer performance of a power transmitter designed in accordance with an embodiment of the present invention.

In the test of FIGS. 8A, 8B and 9, the power transmitter transferred power to the power receiver, aiming at reaching six target voltage levels a~f, and actual measurements of the voltage received by the power receiver were made. The target voltage levels for power transfer to the power receiver were set as follows:

a: 4.2V, b: 7.0V, c: 4.2V, d: 7.5V, e: 5.0V, f: 5.0V

From the Guaranteed Power category of FIG. 8B, it is demonstrated that the power transfer performance test results were pass for all the six target voltage levels a~f. More specifically, referring to FIGS. 9(*a*) to 9(*f*), it is demonstrated that power was transferred to the power receiver at appropriate voltage levels, without a large deviation from the target voltage levels.

Besides, referring to FIGS. 8A and 8B, it is demonstrated that the power transmitter of the invention satisfies all the power transmitter specifications defined by the WPC standard.

FIGS. 10A, 10B, 11A and 11B show test results of the transmit power level adjustment function of a power transmitter designed in accordance with an embodiment of the present invention.

More specifically, FIGS. 10A, 10B, 11A and 11B show test results of the transmit power level adjustment function of the power transmitter when the target power level is 8 W, 15 W, 12 W, and 15 W, respectively. In FIGS. 10A, 10B, 11A and 11B, a "Sent Control Error: n" message indicates that the power currently received by the power receiver is n W less than the target transmit power.

Referring to the test results of FIGS. 10A, 10B, 11A and 11B, the power transmitter of this invention may find out how far the current level of power being transferred to the power receiver falls below the target power level by performing communication with the power receiver, and based on this, may adjust the transmit power level to the target power level. That is, the test results of FIGS. 10A, 10B, 11A and 11B reveal that the power transmitter of this invention may adjust the transmit power level to the target power level by performing proper communication with the power receiver.

Figure 13:
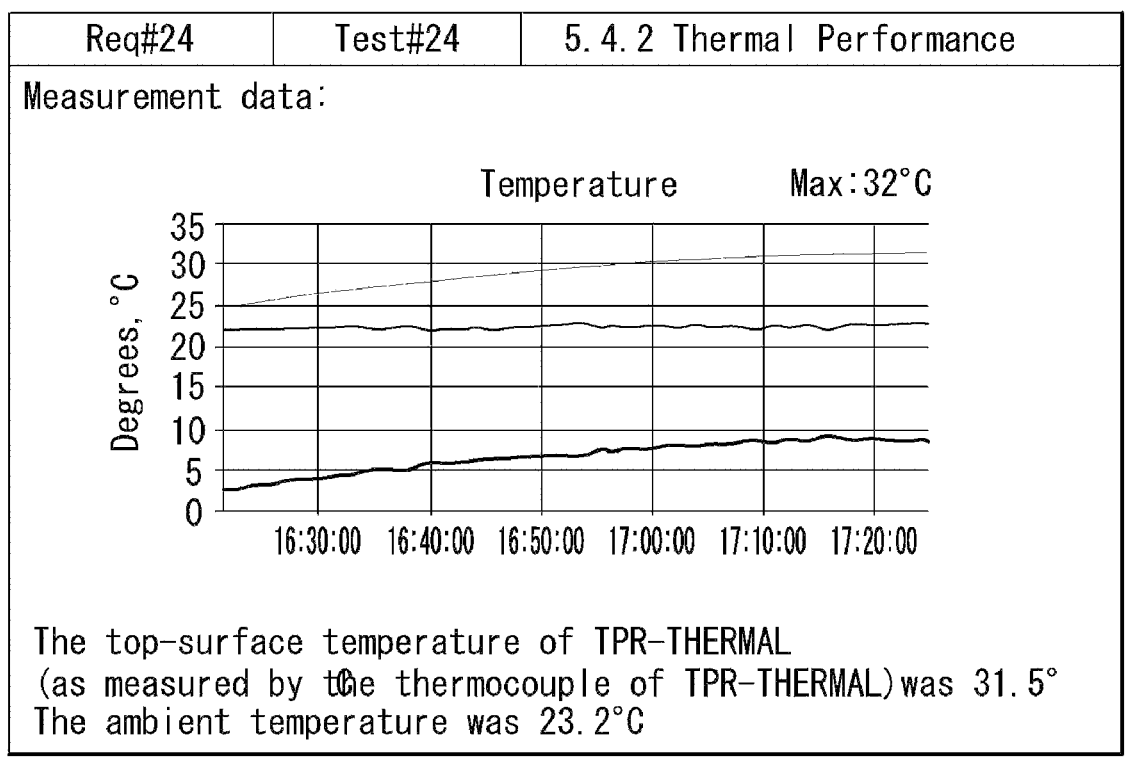

FIGS. 12 and 13 show test results of the thermal performance of a power transmitter designed in accordance with an embodiment of the present invention.

More specifically, FIG. 12 shows test results from measurements of temperature changes in a foreign object (FO) when a power transmitter designed in accordance with an embodiment of the present invention transfers low power (about 5 W) to the FO, rather than the power receiver. FIG. 13 shows test results from measurements of temperature changes in the power receiver when the power transmitter transfers low power to the power receiver.

Referring to FIG. 12, it is demonstrated that the FO temperature did not go up or it increased up to 49° C. Referring to FIG. 13, it is demonstrated that the temperature of the power receiver increased up to 32° C.

From these test results, it can be said that the power receiver or FO that receives power from the power transmitter does not rise above a specific temperature, and this allows the user to use the power transmitter of this invention without risk of explosion or fire.

Furthermore, the drawings have been divided and described for convenience of description, but the embodiments described with reference to the drawings may be merged and designed to implement new embodiments. Furthermore, the display device is not limited and applied to the configurations and methods of the aforementioned embodiments, but some or all of the embodiments may be selectively combined and configured so that the embodiments are modified in various ways.

Furthermore, although some embodiments of this specification have been illustrated and described, this specification is not limited to the aforementioned specific embodiments and may be modified in various ways by those skilled in the art to which this specification pertains without departing from the gist of this specification claimed in the claims. The modified embodiments should not be individually interpreted from the technical spirit or prospect of this specification.

Various embodiments have been described in the best mode for invention.

The present invention may be applicable to various wireless charging technologies.

What is claimed is:

1. A wireless power transmitter that transfers power to a wireless power receiver, comprising:
   a coil assembly comprising first and second bottom coils placed adjacent to each other in a line and each consisting of a single layer of 11 turns and a top coil stacked on the first and second bottom coils and consisting of a single layer of 12 turns;
   a series capacitor;
   a shielding extending to at least 2 mm beyond an outer boundary of the coil assembly, and being composed of Mn—Zn; and
   a full-bridge inverter driving each coil included in the coil assembly individually, wherein the first and second bottom coils and the top coil are a wire-wound type and consist of a Litz wire having 105 strands of 0.08 mm diameter, wherein the first and second bottom coils and the top coil have a substantially rectangular frame structure with a through hole in the center, wherein the top coil lies on a plane surface in the middle between the first and second bottom coils, wherein a distance from the center of the first and second bottom coils to the center of the top coil is set to a range of 21 mm to 25 mm, wherein the first and second bottom coils have a height of 48 mm to 50 mm and a width of 43 mm to 45 mm, and the through hole in the first and second bottom coils has a height of 25 mm to 27 mm and a width of 21 mm to 23 mm, wherein the top coil has a height of 45 mm to 47 mm and a width of 48.5 mm to 50.5 mm, and the through hole in the top coil has a height of 20 mm to 22 mm and a width of 24.5 mm to 26.5 mm, wherein the first and second bottom coils and the top coil have a thickness of 0.9 mm to 1.3 mm, wherein an area of the top coil is 49.5±1.0 mm×46.0±1.0 mm, and an area of the through hole in the top coil is 21.0±1.0 mm×25.5±1.0 mm, and wherein an area of the first and second bottom coils is 49.0±1.0 mm×44.0±1.0 mm and an area of the through hole in the first and second bottom coils is 26.0±1.0 mm×22.0±1.0 mm.

2. The wireless power transmitter of claim 1, wherein a level of power transferred to the wireless power receiver by the coil assembly is controlled based on a level of input voltage applied to the full-bridge inverter.

3. The wireless power transmitter of claim 2, wherein the level of voltage applied to the full-bridge inverter is adjusted within a range of 1 V to 18 V with a resolution of 10 mV.

4. The wireless power transmitter of claim 1, wherein an operating frequency of power signals transmitted from the wireless power transmitter is fixed within a range of 140 kHz to 150 kHz with a duty cycle of 50%.

5. The wireless power transmitter of claim 1, wherein a digital ping voltage for the first and second bottom coils and the top coil is 4.5 V to 5.5 V with an operating frequency of 145 kHz.

6. The wireless power transmitter of claim 1, wherein the series capacitor has a capacitance of 133 nF to 145 nF.

7. The wireless power transmitter of claim 1, wherein the first and second bottom coils and the top coil have a same inductance value within a range of 10.6 μH to 12.0 μH.

8. The wireless power transmitter of claim 1, wherein the first and second bottom coils are placed alongside each other with a distance of 42 mm to 50 mm between centers of the first and second bottom coils.

* * * * *